(12) United States Patent
Grasl

(10) Patent No.: US 6,419,603 B1
(45) Date of Patent: Jul. 16, 2002

(54) DEVICE FOR TRANSMITTING A FORCE, IN PARTICULAR A COMPRESSION FORCE, ALONG A SUBSTANTIALLY STRAIGHT PATH

(76) Inventor: Andreas Grasl, Wiener Strasse 23, A-3452 Heiligeneich (AT)

(*) Notice: Subject to any disclaimer, the term of this patent is extended or adjusted under 35 U.S.C. 154(b) by 0 days.

(21) Appl. No.: 09/403,324
(22) PCT Filed: Apr. 9, 1998
(86) PCT No.: PCT/EP98/02073
§ 371 (c)(1),
(2), (4) Date: Nov. 30, 1999
(87) PCT Pub. No.: WO98/46903
PCT Pub. Date: Oct. 22, 1998

(30) Foreign Application Priority Data
Apr. 15, 1997 (DE) .................................... 297 06 739 U
(51) Int. Cl.[7] .................................................. F16G 1/28
(52) U.S. Cl. ...................... 474/202; 474/148; 474/206; 474/251
(58) Field of Search ................................. 474/148, 202, 474/204, 205, 206, 250, 251

(56) References Cited

U.S. PATENT DOCUMENTS

| 4,317,505 A | 3/1982 | Schneider |
| 4,726,247 A | 2/1988 | Hormann |
| 5,692,984 A | 12/1997 | Kayatani et al. |

FOREIGN PATENT DOCUMENTS

| DE | 3910263 A | 10/1990 |
| DE | 4419853 C | 9/1995 |
| DE | 29706739 A | 7/1997 |
| FR | 1136948 A | 5/1957 |
| GB | 13397 A | 2/1911 |
| JP | H8-159220 A | 6/1996 |

Primary Examiner—David A. Bucci
Assistant Examiner—Vicky A. Johnson
(74) Attorney, Agent, or Firm—Koda & Androlia

(57) ABSTRACT

In a device for transmitting a compressive force along essentially a straight path utilizing an articulated transfer element that can bend in one direction. The transfer element has a toothed side and a back side which is turned away from the toothed side, a plurality of sequential block right projections in the longitudinal direction of the toothed belt and the block like elevations are shaped in such a way that on a straight path they lie against one another to transmit the compressive force.

7 Claims, 4 Drawing Sheets

Figure 1:
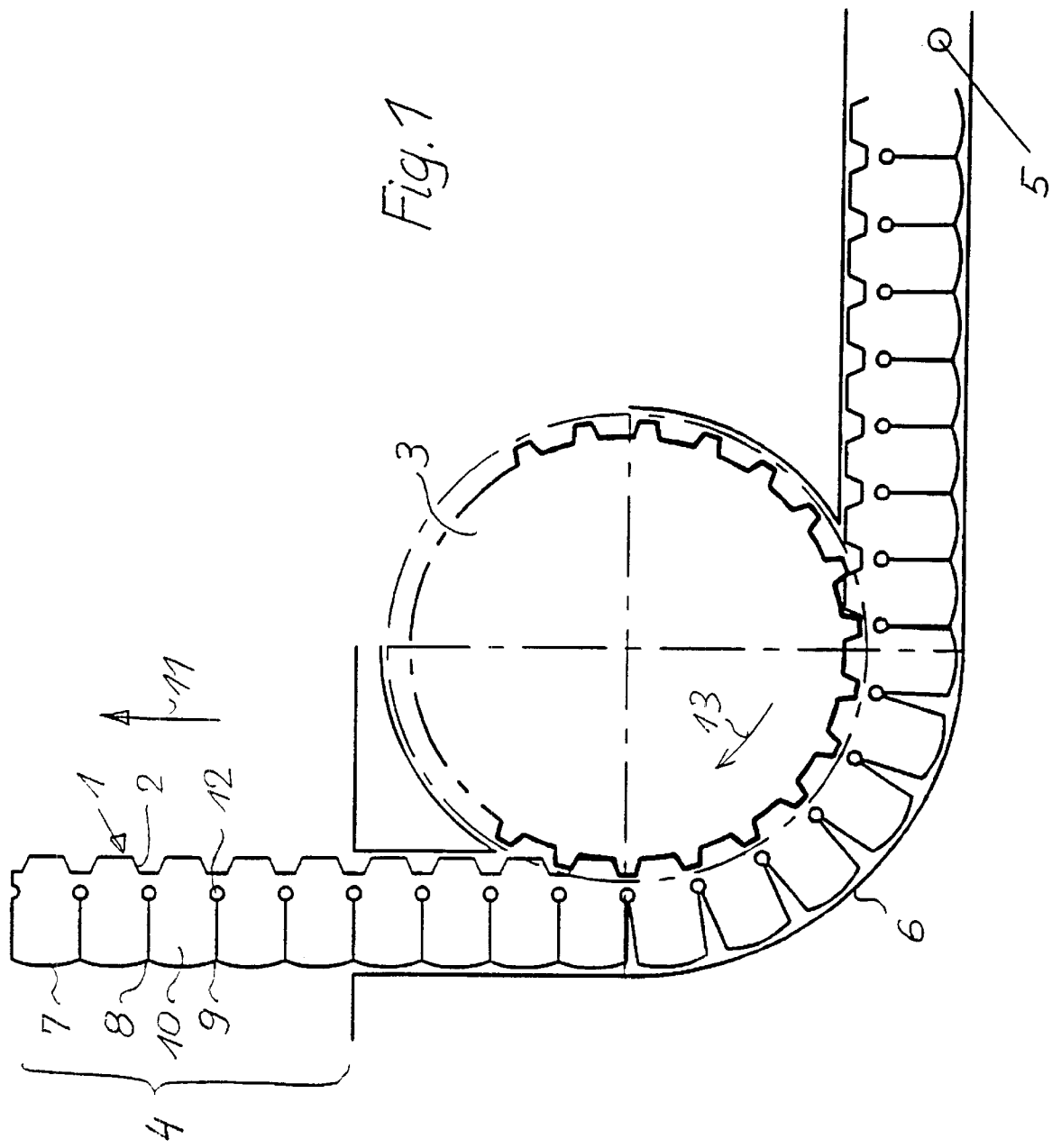

DEVICE FOR TRANSMITTING A FORCE, IN PARTICULAR A COMPRESSION FORCE, ALONG A SUBSTANTIALLY STRAIGHT PATH

The invention relates to a device for transmitting a force, in particular a compression force, along an essentially straight path with at least one oblong, articulated transfer element which can bend on one side.

In known devices of this type, the oblong, articulated transfer element which can bend on one side is provided by a link chain similar to a bicycle chain, which has intermediate links to allow bowing out in only one direction. The intermediate links are made and arranged in such a way that when the link chain is aimed straight and is under the influence of a compression force they lie against one another in order to transfer this compression force from a drive element, for example, a motor, to an object which the motor is supposed to act upon, for example a hinged window or a shutter. The link chain has the advantage over a rigid, oblong transfer element, namely a rod or a bar, that it can be bent and rolled up, if necessary, to save space. However, it is felt to be disadvantageous that the link chain makes noise when it moves and that it wears, which can be eliminated by caring for the link chain, but basically limits its service life. In addition, its manufacture is complicated, namely the production and attachment of the intermediate links onto the link chain.

A variant of this known device, which also belongs to the state of the art known from practice, has two link chains with intermediate elements which are brought together like a zipper at the beginning of a straight path in such a way that the intermediate links alternately mesh and wedge together. The two link chains connected with one another in this way are especially suitable for transmitting compression forces, without any undesired bowing out.

On the other hand, the two link chains can be separated from one another at the beginning of the straight path, by turning each of the two link chains around a chain wheel and pulling the two link chains apart at the gap which is formed between the two chain wheels. Here the intermediate links put on the link chains must be made to function the way a zipper connects and separates. Despite its improved properties for transmitting compression force, this device with two link chains has essentially the same disadvantages as the known device with only one link chain which was explained at the beginning.

By contrast, this invention is based on the task of developing a device of the type mentioned at the beginning for transmitting a force, in particular a compression force, along an essentially straight path, such that the transfer element experiences little wear and makes little noise and also is not complicated to manufacture.

This task is solved in a device of the type mentioned at the beginning.

The toothed belt provided as a transfer element makes it possible to transfer compression force on a straight path and to turn outside the straight path in a manner which produces little noise and experiences little wear. Moreover, the block-like elevations on its back side, which transfer the compression force by lying against one another and supporting one another, can be made as a single piece from the toothed belt directly during its manufacture. Thus, it does away with separate manufacturing processes to produce intermediate links and attach them, as is required for link chains. Moreover, the normal toothed belt which is modified in this simple way is thicker than a normal toothed belt, due to the shape on its back side, so it can function especially reliably.

The device which is especially useful, is characterized by the fact that the block-like elevations on the back side of the toothed belt are formed by slits arranged as indicated. Adding the slits represents only a slight modification of the normal manufacture of the toothed belt.

The further development has an approximately cylindrical recess made at the foot of every slit in the back side of the toothed belt with the slit running transversely to the longitudinal direction of the toothed belt. This recess largely avoids notch effect, which would diminish the mechanical strength of the toothed belt An especially advantageous variant of the device with two oblong, articulated transfer elements which can bend on one side and which are brought together like a zipper along an essentially straight path, has a longitudinal, articulated transfer element which can bend on one side in the form of two toothed belts, each of which has teeth on one side and whose back side, which is turned away from the toothed side, has, in the longitudinal direction of the toothed belt, a series of wedge-shaped elevations arranged with gaps between them so that on the straight path the elevations of the two toothed belts are capable of meshing with one another in alternation, like a zipper. This device with two toothed belts forming a single unit in the straight path section is especially suitable for securely transmitting compression forces, since the two toothed belts which interlock like a zipper cannot easily deviate to one side. Moreover, here bringing the toothed belts together into a zipper-like connection, but also the opposite motion sequence of separating them, produces especially little noise. This device is also characterized by the fact that it is simple to manufacture, for the reasons mentioned above.

In particular, in the last-mentioned variant of the device with two toothed belts, the wedge-shaped elevation is shaped, if the toothed belt is viewed from the side, so that it gradually changes from a narrow foot section into the back side of the toothed belt, widening outward from the foot section symmetrically to an axis of symmetry which runs at right angles to the longitudinal direction of the toothed belt On the outside, the wedge-shaped elevation is terminated by a head section which has roughly the shape of a cuboid. This shape of the wedge-shaped elevation makes possible, on the one hand, low-friction, zipper-like interlocking of the two toothed belts and their separation, and on the other hand, secure transfer of the compression force when the two toothed belts are connected.

It is advantageous for the flanks of the wedge-shaped elevations to be rounded off in the area which widens to make the zipper-like connection and separation of the two toothed belts especially low-friction.

The device can be completed by a sprocket, with the toothed belt being turned between the straight path, through which the compression force is transferred, and another path, which leads to the storage place of the toothed belt section which is unnecessary for transferring the pressure.

To complete the device for transmitting a compression force, it can have the feature that the toothed belt is turned on a sprocket. Turning the toothed belt creates a spatial arrangement which saves space. In addition, the sprocket can have a partially bent guide channel for the toothed belt arranged on it which covers the toothed belt over a partial circumference of the sprocket. This guide channel ensures that the toothed belt does not jump off the sprocket, but rather transfers the force exerted on it by the sprocket as a compression force through the straight path.

The embodiment of the device with two toothed belts which are brought together like a zipper along an essentially straight path has a guide channel arrangement which is symmetrical to the straight path, with one sprocket for each toothed belt and one section of the guide channel partially covering each sprocket on the outside. A common straight section of the guide channel is arranged as an extension of the gap between the sprockets. In this respect, this arrangement of the guide channel fulfills the same advantageous function as illustrated further above for an individual sprocket. Moreover, here the two sections of the guide channel which partially cover the sprocket run together in a wedge shape in extension of the gap on the side turned away from the straight section of the guide channel, and form in this place a separation point for the two toothed belts.

The arrangement of the guide channel for two sprockets can be designed in an especially a compact manner as a subassembly or even as a single unit by making the sections of the guide channel to be components of a guide channel part.

In an alternative device for transmitting a compression force, the transfer element consists of sections of an extrusion which has teeth on a contact side to engage into a sprocket mounted so that it can rotate, which has flat support surfaces oriented essentially at right angles to the contact side, with the support surfaces of several of these sections of the extrusion being arranged essentially next to one another and with these sections having means which are capable of holding these sections together in the longitudinal direction of the transfer element in such a way that they can bow out essentially on one side about a virtual transverse axis.

It is not complicated to manufacture this transfer element even for small production runs. This is especially true if the sections are sawed from an aluminum extrusion. In the longitudinal direction of the extrusion whose cross section is essentially rectangular, the support surfaces of the sections are performed on two external sides turned away from one another, so that the size of the support surfaces of the separated or sawed off sections is obtained in a simple manner from the longitudinal distances between the separation points of the extrusion. Thus, the size of the support surfaces can be adjusted in a flexible manner to the forces to be transferred through the support surfaces, and this is easy to accomplish, without additional tools. This makes it possible to produce even large support surfaces very simply, which exert small surface pressures. It is not necessary to use a material which has especially great strength, which in turn makes it easier on the separation and processing tool.

A first possibility of forming the means of holding these sections together in the longitudinal direction in such a way that they can bend out essentially on one side is by shaping the sections, or the extrusion from which they are cut to length. Here the link cylinder on one end of a section and the link socket partially By encompassing it on the end of an immediately neighboring section form a pivoting link which can pivot sufficiently so that the transfer element can turn, typically about 90°. The link socket and the link cylinder are performed on two edges of the extrusion which are turned away from one another, so after the sections are separated from the extrusion they do not need to be shaped.

In a further development, these sections, which are put together into the transfer element, can be prevented from coming apart on the side by passing a bolt through a hole which goes through the transfer element in the transverse direction and which also covers the link socket partially encompassing this ink cylinder on the side.

A usually simpler alternative embodiment of the means of holding these sections together in the longitudinal direction in such a way that they can bend out essentially on one side, which comprises at least one hole going through each section at right angles to the support surfaces, that is in the longitudinal direction of the transfer element and parallel to and near the contact side of the section, which hardly affects its ability to bend out in essentially one direction. The specific means are completed by at least one oblong, flexibly bending connection element which passes through the holes going through the sections lying essentially next to one another. It is expedient for this connection element to be a wire cord.

It is preferable for the first end of the flexibly bending connection element or steel cord to be connected with an extreme section of the transfer element, and for its second end to be held under tension by a spring near an opposite extreme section of the transfer element.

The latter safety measure is especially useful outside a housing in which especially the sprocket(s) is (are) mounted so it (they) can rotate. Inside the housing, by contrast, it is sufficient to have two parallel, flat guide surfaces between which the transfer element is guided.

Figure 2:
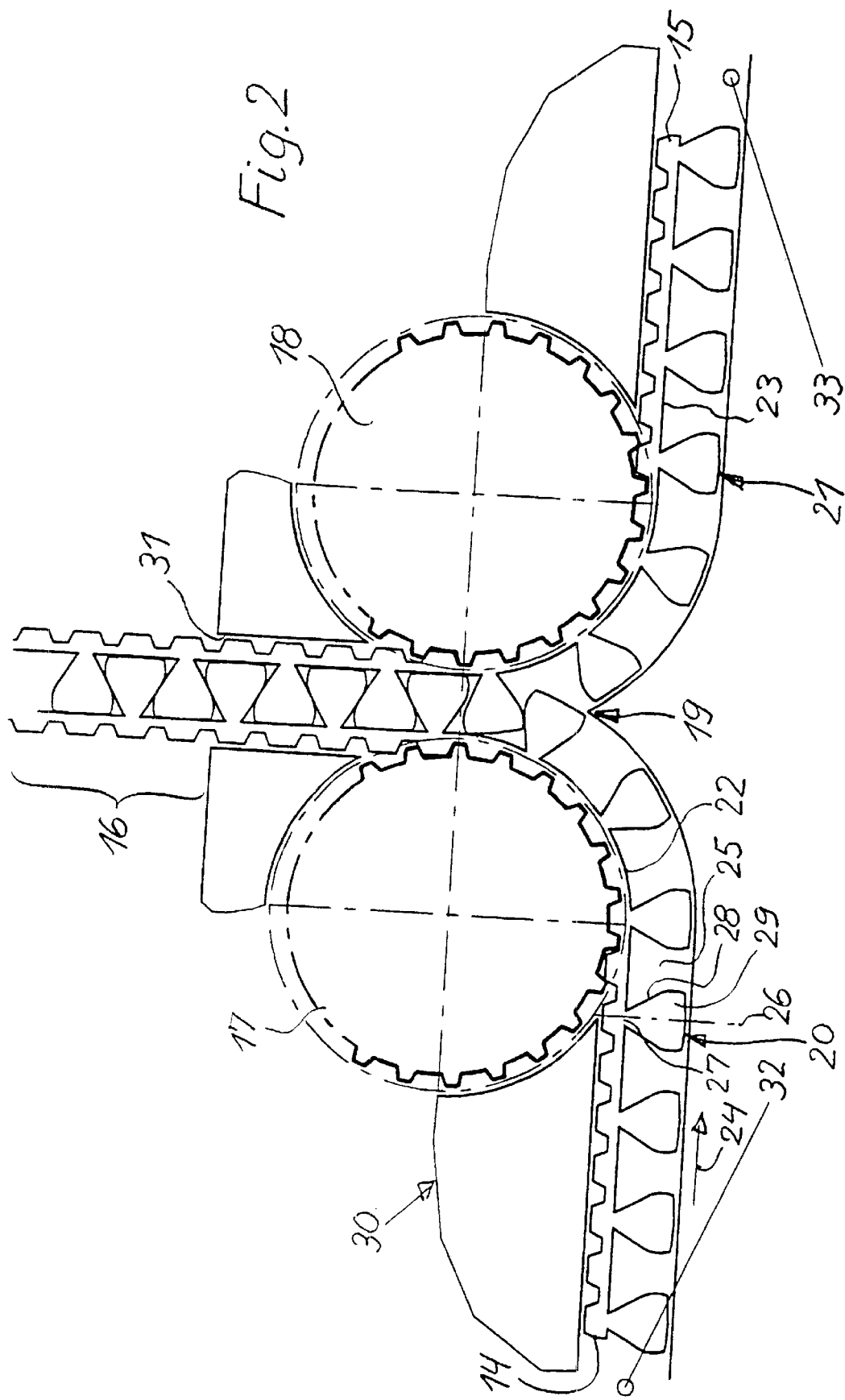
Figure 3:
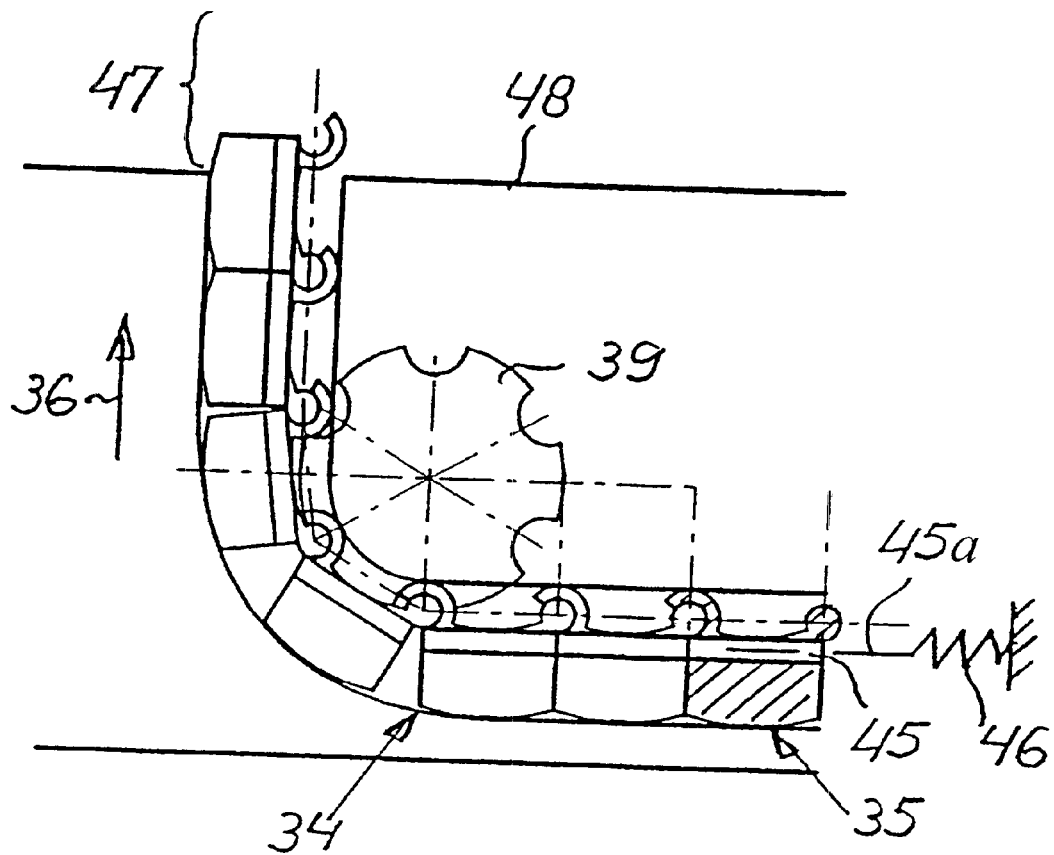
Figure 4:
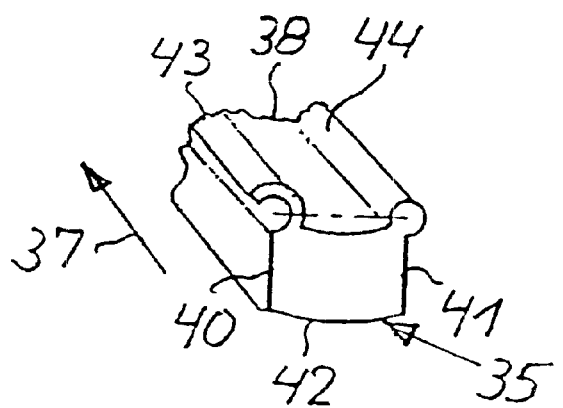
Figure 5:
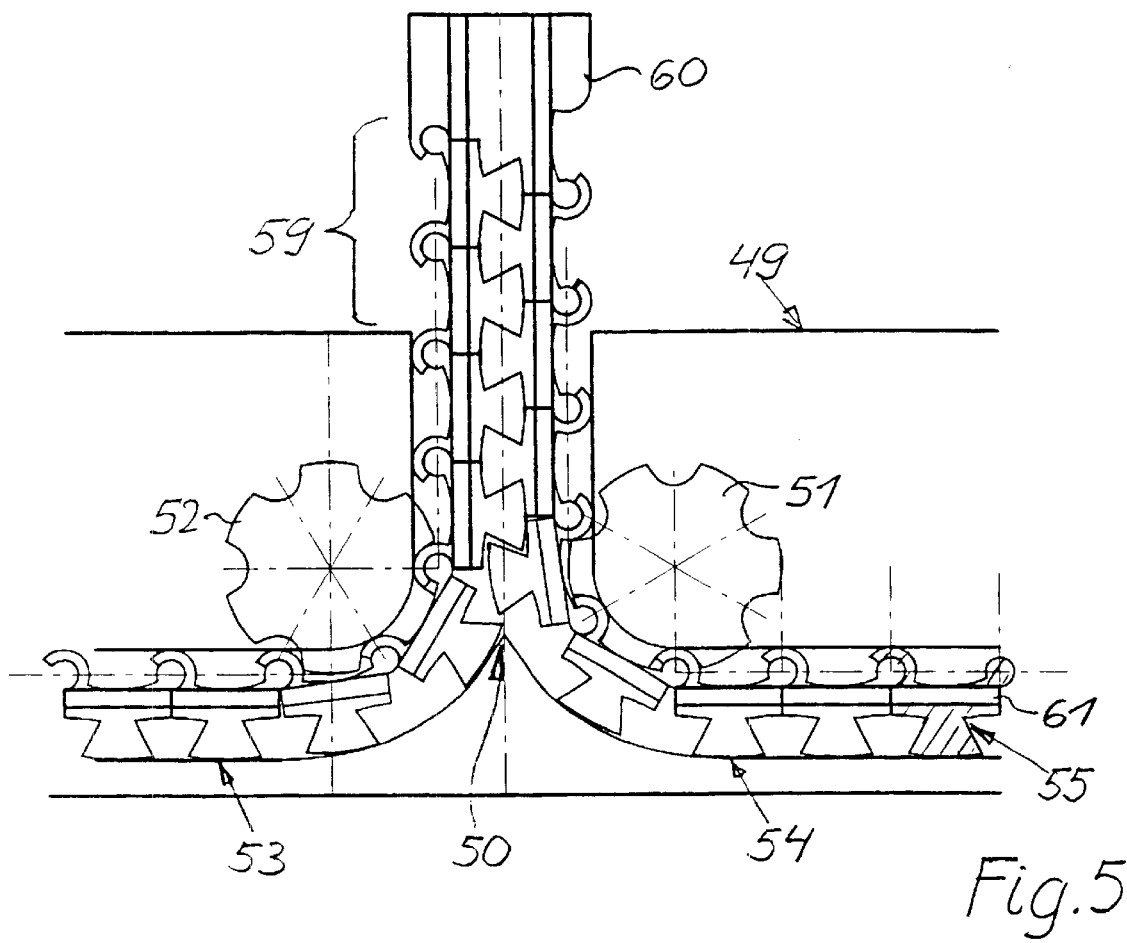
Figure 6:
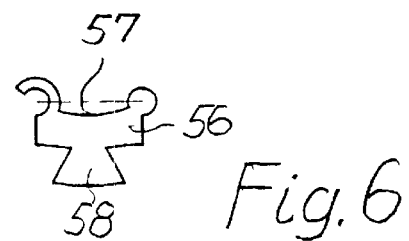

In a simplest embodiment the sections separated from the extrusion are approximately cuboid. Their contact sides are capable of engaging in a sprocket and cam transfer considerable compression forces, e.g. to a window, over a straight path of the simple transfer element or strand which they form, without bowing out However, bowing out to the side on the straight path can be prevented to a much greater extent by two transfer elements, which themselves can bend on one side, which are made from sections of an extrusion described above, and which are put together like a zipper. This is accomplished by the design of the sections, each of which has a flat, cuboid-shaped foot section, on the outside of which are support surfaces turned away from one another and a wedge-shaped elevation projecting from them at right angles. Such elevations which lie opposite one another and mesh together are capable of interlocking with one another like a zipper. This should not be confused with the interlocking of the sprockets, which are in contact with the contact side of the sections and which are preferably, but not exclusively, designed as a mangle gear Sample embodiments of the invention are described below using a drawing with six figures. The figures are top views showing the following:

FIG. 1 a section of a first device for transmitting a compression force (top view in the area of a sprocket);

FIG. 2 a second embodiment, this one with two toothed belts which are brought together like a zipper between two sprockets in the area of a part of a guide channel;

FIG. 3 a third embodiment, this one with a transfer element which consists of sections of an extrusion;

FIG. 4 a section of an extrusion representing a detail of FIG. 3;

FIG. 5 a fourth embodiment, this one two transfer elements which consist of sections of an extrusion; and FIG. 6 a section representing a detail of FIG. 5.

In FIG. 1 number 1 generally designates a toothed belt, which has common toothing on one side of it (in the drawing it is on the inside), which engages with the matching toothing of a sprocket 3. The sprocket turns the toothed belt over about a quarter of its circumference from a straight path 4 to another section 5, where a section of the toothed belt can be stored in a manner not shown to save space when it does not have any force transfer function.

The turning area has a guide channel 6 extending over it, which on the one hand borders on the outside circumference of the sprocket 3 and in the turning area ensures that the toothed belt lies against the sprocket even if the toothed belt is not taught, but rather is transferring pressure, especially from sprocket 3 over the straight path 4 to an object which is not shown, for example a hinged window or a shutter.

To transfer pressure, the toothed belt is designed thicker than normal and has incisions on its back side 7, e.g. 8, 9, which border a block-like elevation 10 on the side. As can be seen from the drawing, the slits run at right angles to the longitudinal direction of the toothed belt which in FIG. 1 is marked with an arrow 11 referring to the straight path 4.

FIG. 1 also shows an approximately cylindrical recess 12 at the foot of each slit, e.g. 8, to avoid damaging notch effects there.

The compression force is transferred in the straight path 11 by the block-like elevations lie against one another at the slit under the action of the compression force, to create a practically positive connection to the driven organ.

To produce this compression force, the sprocket can be moved clockwise in the direction of an arrow 13 by the force of a motor.

If the sprocket 3 rotates in the opposite direction, the section of the toothed belt 1 is tightened in the area of the straight path 4, and the toothed belt can be turned in the direction shown in the area of the toothed belt in order to keep another section 5 of the toothed belt on the driving side of the sprocket 3.

In the second design shown in FIG. 2, two toothed belts 14 and 15 run together between two sprockets 17, 18. The toothed belts 14, 15 are brought together in a gap 19 between the sprockets 17, 18 into a single unit like a zipper, which extends over the straight path 16 to an organ to be acted upon (not shown), for example a window or a shutter.

Both toothed belts (14, 15) have substantially wedge-shaped projections, e.g. 20,21, on their back sides 22, 23. Each of the two toothed belts 14, 15 has wedge-shaped projections 20, 21 arranged on it one after the other in the longitudinal direction, here, e.g. the longitudinal direction of arrow 24, with there being a gap, e.g. 25, between two neighboring wedge-shaped projections which is shaped in such a way by the bordering wedge-shaped projections that a wedge-shaped projection of the other toothed belt, here 15, fits in the gap if the two toothed belts 14, 15 are brought together in the gap 19 between the sprockets 17, 18. For this reason, the wedge-shaped projections are shaped symmetrically to an axis of symmetry, see, e.g., the dashed and dotted line 26, and have a relatively narrow foot section 27 and an area 28 widening outward from it, which is closed on the outside by an approximately cuboid-shaped head section 29. In the area of the two toothed belts which interlock with one another like a zipper, for example in the straight path 16, it can be seen that the wedge-shaped projections, which are not labelled there, largely fill the gaps, which are also not numbered there, and their widening areas lie against one another, which transfers the compression force.

The device is completed by a guide channel part 30, which is symmetrical to the straight path 16, more precisely to its center line, which is not labeled. The guide channel part 30 has a common straight guide channel section 31 for both toothed belts 14, 15 which interlock with one another and which are guided through this guide channel section in the direction of the straight section 16. Moreover, the guide channel part 30 comprises two guide channel sections 32, 33 which are similar to the guide channel 6 in FIG. 1 and which cover the sprockets 17, 18 over about a quarter of their outside circumference. On the just-mentioned guide channel sections 32, 33 the individual toothed belts 14, 15 are turned by about 90° to the places at which the ends of these toothed belts can be stored to save space when they are essentially free of force. At the place to which the reference line 19 for the gap between the sprockets 17, 18 points, the guide channel sections 32, 33 run together in the shape of a wedge, and there they form a separation point for the two toothed belts 14, 15.

From FIG. 2 it can be seen that the device, together with the guide channel part, is very compact and can be expected to operate reliably.

FIG. 3 shows a third embodiment of the device for transmitting a compression force which has a transfer element which is generally designated with 34. It consists essentially of adjacent sections 35 of an extrusion, which is not shown in its entirety. FIG. 4 shows one such section drawn out separately, while FIG. 3 shows it in cross section. Thus, the sections of the extrusion can also be designated as inks of the transfer element.

The longitudinal direction of the transfer element, which is marked with 36, does not correspond to the longitudinal direction (37) of the extrusion, which is indicated by an arrow in FIG. 4, but rather the sections 35 in the longitudinal direction 36 of the transfer element are placed next to one another practically transverse to the longitudinal direction 37 of the original extrusion.

Each section or link 35 has a contact side 38 which is capable of engaging in a mangle gear of a sprocket 39 (see FIG. 3) which is mounted so that it can rotate. Approximately at right angles to the contact side, section 35 has two flat support surfaces 40, 41, which are turned outward away from one another, so that adjacent sections rest against one another on these support surfaces and can transfer compression forces (again see FIG. 3). The approximately cuboid-shaped or box-shaped section is completed by a slightly concave, curved outside 42.

In order that each two such neighboring sections can be connected with one another in such a way that they can bend out to one side, on one end of each of them, where contact surface 38 and support surface 40 meet, there is a hinge lug 43, which is capable of encompassing part of a hinge boss 44 of a neighboring section. When considering one and the same section (here 35), the hinge boss 44 is always on its other end, namely at the place where the contact side meets the support side 41. In particular, FIG. 3 shows how the hinge lug 43 always encompasses the hinge boss 44 of the neighboring section. Hinge lug 43 does not completely encompass hinge boss 44, but rather only enough that neighboring sections can bend out from one another far enough to follow the partial circumference of sprocket 39, so that the transfer element turns. In the example, the entire turn is 90°, so that sections neighboring one another bend out less than 90°.

To ensure that the sections 35 connected in this manner cannot come apart from one another on the side, i.e., perpendicular to the plane of projection, where they are not held by other elements, the sections have holes 45 running through them near their contact sides and parallel to them, which can only be seen in the sections shown in FIG. 3 or FIG. 5. These holes can have a steel cord (not shown) passed through them, which connects the sections of the transfer element with one another by connecting one outside end of the steel cord with an outside section, while the opposite end of the steel cord is held under tension by a spring marked with the number 46. The path on which the adjacent sections 35 of the transfer element 34 can transfer a compression force to an element which is supposed to be acted upon, for example a window, is marked in FIG. 3 with curly bracket 47. This path lies free, outside a guide channel arrangement 48.

In the embodiment shown in FIG. 5, the guide channel arrangement marked there with number 49 is analogous to the guide channel part 30 in FIG. 2 in that it has two horizontal guide channel sections which run together in a wedge shape in extension of the gap 50 between two rotating sprockets 51, 52 lying opposite one another, to make it possible to bring together in a zipper-like manner, and to separate, two transfer elements 53 and 54, which consist of sections suitable for this.

Such a section 55 is drawn out separately in FIG. 6. It consists essentially of a flat cuboid-shaped foot section 56, which borders the contact surface 57, and of an elevation 58 which is on the foot section's outward-facing side and projects out from it and which is shaped in such a way that the space between two neighboring elevations of the sections of the one transfer element, e.g. 53, can hold a wedge-shaped elevation of the other transfer element e.g. 54.

Thus, the elevations form teeth (see FIG. 5 above the unmarked axes of the sprockets 51, 52). The path of interlocking transfer elements 53, 54 projecting from the guide channel arrangement 49 is marked with number 59. Although the transfer elements are not guided on the side, they can transfer considerable compression forces through this path to a connecting piece 60, without deviating to the side.

Adjacent sections of each transfer element can, in turn, be held together by a steel cord 45a, which passes through holes going through the sections.

What is claimed is:

1. A device for transmitting a force, in particular a compression force, comprising two oblong, articulated transfer elements (14, 15) which can bend in one direction and which are meshed together like a zipper along an essentially straight path;

wherein the two oblong, articulated transfer elements (14, 15) which can bend in one direction each have teeth on one side and whose back side, which is turned away from the toothed side, has, in the longitudinal direction of each entire transfer element (14, 15), a series of wedge-shaped projections (20, 21) arranged with gaps (22) between them so that on the straight path the projections (20, 21) of the two transfer elements (14, 15) arc capable of meshing with one another alternately like a zipper, characterized by the fact that:

each of the transfer elements is a toothed belt (14, 15);

the wedge-shaped projections (20, 21), when viewed from a longitudinal side of the toothed belt, each merge via a narrow foot section into the back side of the toothed belt, widen outward from the narrow foot section symmetrically to an axis of symmetry (26), which is at right angles to the longitudinal direction of the toothed belt, and is shaped into an approximately cuboid head section (29) which is integrally connected to the narrow foot section; and an arrangement of two toothed belts (14, 15) which are meshed like a zipper along an essentially straight path (16) has a guide channel arrangement which is symmetrical to the straight path (16), with one sprocket (17, 18) for each toothed belt (14, 15) and one guide channel section (32, 33) partially covering each of these sprockets (17 or 18) on the outside, that a common straight guide channel section (31) in extension of a gap (19) between the sprockets (17, 18) is arranged on one side of the gap, and that on the other side of the gap (19), in extension of it, the two guide channel sections (32, 33) partially covering the sprockets (17, 18) run together in the shape of a wedge and there b a separation point for the two toothed belts (14, 15).

2. The device according to claim 1, characterized by the fact that flanks of the wedge-shaped elevations (20, 21) are rounded off at the transitional places between the widening area (28) and the head section (29).

3. The device according to claim 1, characterized by the fact that the toothed belt is turned on a sprocket (3, 14, 15).

4. Device according to claim 3, characterized by the fact that the sprocket (3) has a partially curved guide channel (6) for the toothed belt arranged on it which covers the toothed belt over a partial circumference of the sprocket (3).

5. Device according to claim 1, characterized by the fact that the guide channel sections (31, 32, 33) are components of a guide channel part (30).

6. A device for transmitting a force, in particular a compression force, comprising two oblong, articulated transfer elements (14, 15) which can bend in one direction and which are meshed together like a zipper along an essentially straight path;

wherein the two oblong, articulated transfer elements (14, 15) which can bend in one direction each have teeth on one side and whose back side, which is turned away from the toothed side, has, in tho longitudinal direction of each entire transfer element (14, 15), a series of wedge-shaped projections (20, 21) arranged with gaps (22) between them so that on the straight path the projections (20, 21) of the two transfer elements (14, 15) are capable of meshing with one another alternately like a zipper, characterized by the fact that:

each of the transfer elements is a toothed belt (14, 15);

the wedge-shaped projections (20, 21), when viewed from a longitudinal side of the toothed belt, each merge via a narrow foot section into the back side of the toothed belt, widen outward from the narrow foot section symmetrically to an axis of symmetry (26), which is at right angles to the longitudinal direction of the toothed belt, and is shaped into an approximately cuboid head section (29) which is integrally connected to the narrow foot section;

flanks of the wedge-shaped elevations (20, 21) are rounded off at the transitional places between the widening area (28) and the head section (29); and an arrangement of two toothed belts (14, 15) which are brought together like a zipper along an essentially straight path (16) has a guide channel arrangement which is symmetrical to the straight path (16), with one sprocket (17, 18) for each toothed belt (14, 15) and one glide channel section (32, 33) partially covering each of these sprockets (17 or 18) on the outside, that a common straight guide channel section (31) in extension of a gap (19) between the sprockets (17, 18) is arranged on one side of the gap, and that on the other side of the gap (19), in extension of it, the two guide channel sections (32, 33) partially covering the sprockets (17, 18) run together in the shape of a wedge, and there they form a separation point for the two toothed belts (14, 15).

7. A device for transmitting a force, in particular a compression force, comprising two oblong, Emulated transfer elements (14, 15) which can bend in one direction and which are meshed together like a zipper along an essentially straight path;

wherein the two oblong, articulated transfer elements (14, 15) which can bend in one direction each have teeth on one side and whose back side, which is turned away from the toothed side, has, in the longitudinal direction of each entire transfer element (14, 15), a series of wedge-shaped projections (20, 21) arranged with gaps (22) between them so that on the straight path the projections (20, 21) of the two transfer elements (14, 15) are capable of meshing with one another alternately like a zipper, characterized by the fact that:

each of the transfer elements is a toothed belt (14, 15), the wedge-shaped projections (20, 21), when viewed from a longitudinal side of the toothed belt, each merge via a narrow foot section into the back side of the toothed belt, widen outward from the narrow foot section symmetrically to an axis of symmetry (26), which is at right angles to the longitudinal direction of the toothed belt, and is shaped into an approximately cuboid head section (29) which is integrally connected to the narrow foot section;

the toothed bell is turned on a sprocket (3, 14, 15); and an arrangement of two toothed belts (14, 15) which are brought together like a zipper along an essentially straight path (16) has a guide channel arrangement which is symmetrical to the straight path (16) with one sprocket (17, 18) for each toothed belt (14, 15) and one guide channel section (32, 33) partially covering each of these sprockets (17 or 18) on the outside, that a common straight guide channel section (31) in extension of a gap (19) between the sprocket (17, 18) is arranged on one side of the gap, and that on the other side of the gap (19), in extension of it, the two guide channel sections (32, 33) partially covering the sprockets (17, 18) run together in the shape of a wedge, and there they form a separation point for the two toothed belts (14, 15).

\* \* \* \* \*